July 2, 1929.   T. BENNETT   1,719,419
SEPTIC TOILET TANK
Filed April 26, 1923

INVENTOR.
Thomas Bennett
by Parker & Prochnow
ATTORNEYS.

Patented July 2, 1929.

1,719,419

UNITED STATES PATENT OFFICE.

THOMAS BENNETT, OF PERRY, NEW YORK, ASSIGNOR TO KAUSTINE COMPANY, OF PERRY, NEW YORK.

SEPTIC TOILET TANK.

Application filed April 26, 1928. Serial No. 272,935.

This invention relates to septic toilet tanks of that kind which are positioned beneath the toilets so that the sewage falls directly into the tank. More particularly the invention refers to a submergence device or means for insuring the proper submersion of the sewage, paper and other matter into the liquid in the tank.

In one form of septic toilet tank, a drop tube or sleeve extends directly downward from the toilet into the tank below the level of the liquid therein, and the tank is provided below the bottom of the drop tube with baffle plates or members for diverting the sewage laterally beyond the periphery of the drop tube so that gases formed by fermentation do not rise into and escape through the drop tube. The bacteriological action which takes place in the tank results in the formation of a scum on the surface of the liquid and which is essential to the proper disposal of the sewage. If this scum is much disturbed or broken, this action is interfered with.

Some objects of the invention are to provide a septic toilet tank with means for effecting the submergence of the waste matter deposited in the tank through the drop tube connecting the latter with the toilet; also to provide a submergence device disposed within the lower end of the drop tube and projecting into the upper portion of the liquid in the tank, and which is reciprocable upwardly out of the liquid and downwardly to engage and submerge the floating deposits; and also to provide means for this purpose of simple construction and which is readily accessible for easy operation.

Other objects are to provide a submergence device for septic tanks to cooperate with the baffles in the tank below the drop tube in confining what disturbance if any, of said device upon the liquid in the tank to an area circumscribed by the lower end of said tube and said baffles to prevent the disturbance of the scum on the surface of the liquid in the tank, while nevertheless effecting thorough immersion of the waste matter into the liquid.

Also to improve septic toilet tanks in the other respects hereinafter set forth and claimed, to the end that more complete and effective disposal of the sewage may be effected.

Figure 1:
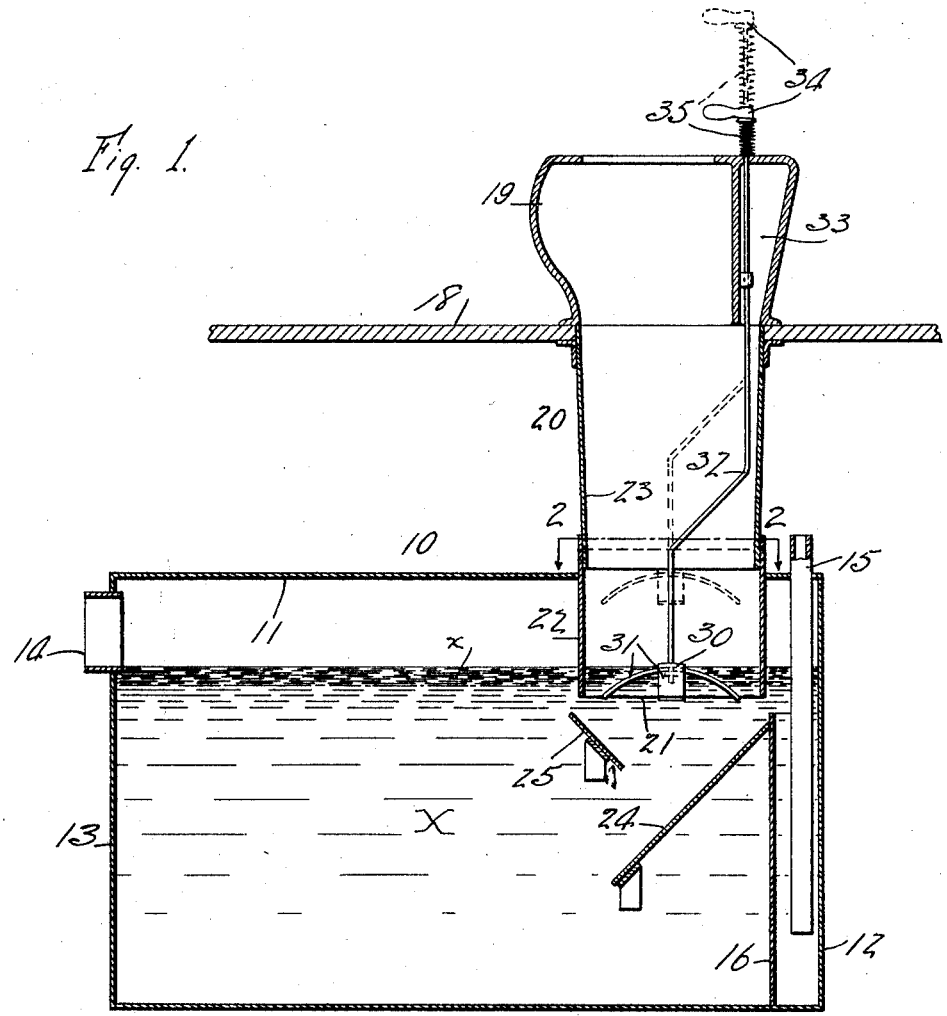
Fig. 1 is a central, vertical, sectional elevation, partly broken away, of a septic toilet tank embodying this invention.
Figure 2:
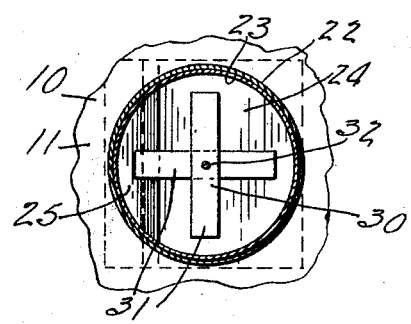
Fig. 2 is a fragmentary, horizontal section thereof, on line 2—2, Fig. 1.

As illustrated in the drawings, the invention is applied to a cylindrical septic toilet tank 10 having its axis arranged horizontally. The tank is formed by a horizontal, cylindrical shell 11 closed by end walls 12 and 13. The latter wall is provided with an outlet sleeve or connection 14, the lower end of which is disposed at such elevation as to determine the desired level of the liquid X in the tank. Additional water may be supplied to the tank from time to time, as by means of a pipe 15 extending into the tank adjacent the end wall 12, with its lower end some distance below the upper end of a baffle or wall 16. This baffle is secured to the end wall of the tank and extends to the bottom of the tank. This water may, if desired, be drainage water or discharge from a wash basin or sink.

As shown in Fig. 1, the tank is arranged at some distance below the ground level or floor 18, at which elevation the toilet bowl 19 is arranged. The sewage or waste matter from the bowl 19 is conducted to the tank through a vertical drop tube or sleeve 20, which extends directly from the lower end of the bowl directly down into the tank with its lower end 21 projecting a short distance below the level $x$ of the liquid in the tank. Preferably the drop tube 20 is made in two parts, a lower section 22, which is in the form of a cylindrical sleeve secured in a hole in the upper wall of the tank and with its upper end extending a short distance above the same. Connected to this upper end of the sleeve 22 is a section 23 which is made of suitable length to extend between and connect the sleeve 22 of the drop tube 20 with the bowl.

As shown in Fig. 1, the tank is provided a short distance below the lower end of the drop tube 20 with transverse inclined baffle plates 24 and 25. The plate 24 is inclined and is so proportioned that the material passing through the drop tube is received thereon and deflected laterally so as to be deposited in the tank beyond the periphery of the drop tube, so that gases formed during the decomposition of this matter will rise into the upper part of the tank 10 around the drop tube instead of passing upwardly out of said drop tube. In a like manner, material engaging the other plate 25 will be diverted therefrom upon the plate 24 from which it will be deflected, as before.

In septic toilet tanks of this kind, the disposal of the sewage is effected by fermentation or bacteriological action, resulting in the formation of a layer of scum on the top of the liquid in the tank and the evolution of a certain amount of gas. This scum on the top of the liquid in the tank is essential to the proper functioning and disposal of the sewage, and if this scum is disturbed or broken up to any extent, proper disposal of the sewage is interfered with. Consequently, by extending the lower end of the drop tube 20 into the liquid, and preferably below the level of the scum, the disturbance of this scum is avoided, and also the gases which collect at the top of the tank cannot escape upwardly through the drop tube or sleeve as the liquid in the lower end thereof forms a seal.

It has been found that some of the sewage and other waste matter such as paper and the like passing through the drop tube 20 tends to collect and float on the top of the liquid in the area within the lower end of the drop tube, with the result that the drop tube becomes obstructed and the proper action of the septic tank impeded.

In accordance with this invention, therefore, a submergence device 30 for effecting the proper immersion of this waste matter by forcing it downwardly into the liquid in the tank, is provided.

This device 30 is arranged approximately at or just below the level of the liquid and is located within the lower end of the drop tube 20. The device 30 may be of any suitable construction, that shown in the drawings comprising a pair of relatively narrow crossed strips or plates 31 which are preferably curved downwardly towards their ends and are secured at their intersection to the lower end of an operating rod or member 32 which extends upwardly through the tube to a position where it can be grasped or operated. By making the crossed members of the curved or downwardly inclined form shown, any material dropping upon the upper surfaces of the members can be readily deflected downwardly into the tank. Preferably, the rod is offset between its ends so that its upper end can be extended upwardly through a rear compartment 33 in the bowl above which it is provided with a handle 34.

This construction of the submergence device 30 is such that it can effectively engage the material for the purpose stated without materially obstructing the passage of sewage through the drop tube, but a submergence device of other construction meeting the foregoing requirements could be substituted therefor.

In the use of the device, the handle 34 is grasped to raise said device upwardly from its normal position shown in full lines to approximately the position shown in dotted lines, this action being repeated by a reciprocating movement so as to thoroughly submerge the material and cause it to be forced towards the bottom of the tank. Preferably a coil spring or other resilient member 35 is interposed between the handle and the top of the bowl to receive the shocks incident to the device in use and to act as a buffer when the device is dropped from its elevated position.

It will be seen from the foregoing description and the illustration of the invention which is disclosed in Fig. 1, that the relative arrangement of the lower end of the drop tube within the upper level of the liquid, the position of the submergence device 30 within this lower end of the drop tube and the location of the baffles 24 and 25 below the drop tube, is such that when the submergence device is actuated, any disturbance of the liquid in its immediate vicinity and within and immediately below the drop tube caused by the use of the device is nevertheless substantially confined to the area within the lower end of the drop tube and the baffles 24 and 25. In this manner, thorough immersion of the matter deposited in the lower end of the drop tube is effected without any appreciable disturbance of the layer of scum at the top of the liquid outwardly beyond or around the drop tube.

The submergence device described is of simple and rugged construction and is relatively inexpensive to make, so that the total cost of an installation of this sort is not materially increased by its use and the device is easily operated to effect the desired results.

I claim as my invention:

1. In a septic toilet tank, the combination of a drop tube extending downwardly through the top of and into said tank with its lower end below the level of the liquid therein, a submergence device disposed within said lower end of said drop tube and which is reciprocable up and down within said drop tube to engage and cause material floating on the liquid within said tube to be forced downwardly and immersed in the liquid in the tank, and means for actuating said submergence device.

2. The combination of a toilet, a septic tank below the same, a drop tube extending directly downward from said toilet through the top of said tank with its lower end below the level of the liquid therein, a submergence device disposed within said lower end of said drop tube, and an operating member therefor extending upwardly through said tube to a position adjacent said toilet, whereby said submergence device can be reciprocated up and down within said tube to cause material floating on the liquid within the latter to be forced downwardly and immersed in the liquid in the tank.

3. In a septic toilet tank, the combination of a drop tube extending downwardly through the top of and into said tank with its lower end below the level of the liquid therein, a reciprocable submergence device disposed within said lower end of said drop tube and which is adapted to engage material floating on the liquid within said tube and force the same downwardly into the liquid in said tank, and a baffle plate arranged in said tank below said tube and in the path of said downwardly moving material for deflecting material laterally beyond the periphery of said drop tube so that gases evolved in the decomposition of said material will not pass upwardly out of said drop tube.

4. In a septic toilet tank, the combination of a drop tube extending downwardly through the top of and into said tank with its lower end below the level of the liquid therein, and a submergence device disposed within said lower end of said drop tube and which is reciprocable up and down within said drop tube to engage and cause material floating on the liquid within said tube to be forced downwardly and immersed in the liquid in the tank, and means for actuating said submergence device, said submergence device having spaced parts which, while effectively engaging the material for the aforementioned purpose, are arranged to permit material falling through said tube to pass thereby into said tank.

5. In a septic toilet tank in which the sewage is decomposed by fermentation and a resulting layer of active scum is formed on the surface of the liquid in said tank, a drop tube extending through the top of said tank with its lower end projecting into said liquid below said layer of scum, a submergence device disposed within and reciprocable up and down in said drop tube to engage and submerge material floating on the liquid within said tube, and stationary parts arranged in said tank below said tube and which coact with the lower end of said tube to restrict any disturbance of the liquid as a result of the use of said device to an area adjacent and below the lower end of said tube, whereby said layer of scum remains substantially undisturbed.

6. In a septic toilet tank in which the sewage is decomposed by fermentation and a resulting layer of active scum is formed on the surface of the liquid in said tank, a drop tube extending through the top of said tank with its lower end projecting into said liquid below said layer of scum, a submergence device disposed within and reciprocable up and down in said drop tube to engage and submerge material floating on the liquid within said tube, and oppositely inclined baffle plates arranged in said tank below said drop tube for deflecting material passing into the liquid to one side of said tube so that gases evolved in the decomposition of said material do not pass upwardly out of said tube, and said baffle plates also acting to restrict any disturbance of the liquid as a result of the use of said device to an area adjacent and below the lower end of said tube, whereby said layer of scum remains substantially undisturbed.

THOMAS BENNETT.